April 28, 1936.    A. ANDERSON    2,038,701
CARRIER HANDLE
Filed Sept. 5, 1933
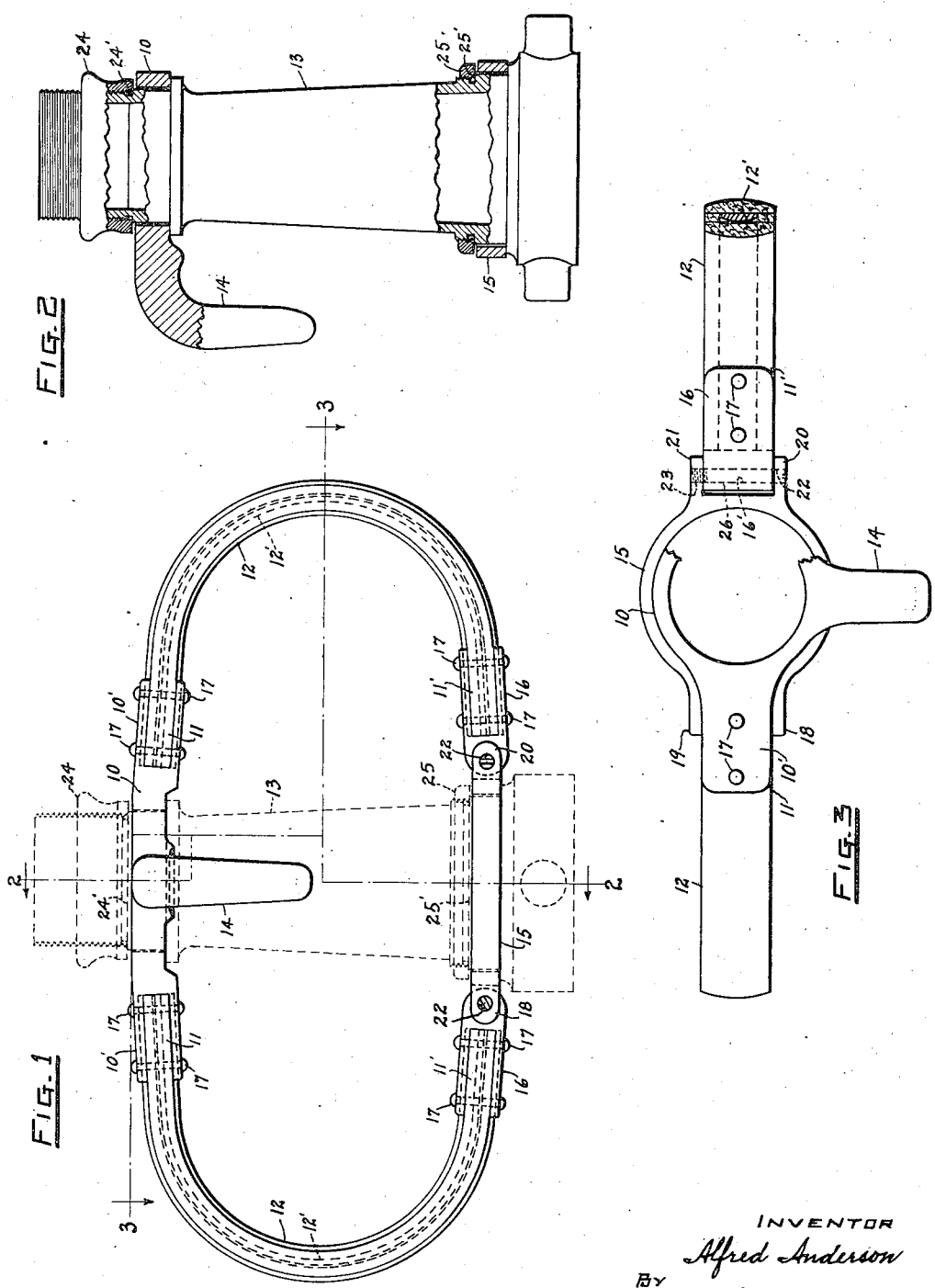
INVENTOR
Alfred Anderson
By
Wm. G. Blomstran.
HIS ATTORNEY.

Patented Apr. 28, 1936

2,038,701

UNITED STATES PATENT OFFICE 2,038,701

CARRIER HANDLE

Alfred Anderson, Chicago, Ill.

Application September 5, 1933, Serial No. 688,134

2 Claims. (Cl. 299—112)

This invention relates in general to carrier handles more particularly adapted for use in connection with fire hose equipment, but more particularly it has reference to an improvement in carrier handles which provide a strong doubleended one piece connecting link between co-relative ends of a pair of metallic reinforced leather handles described and claimed in an application for Patent Serial No. 419,715, filed January 9, 1930, and allowed as of July 6, 1933.

The invention further contemplates the provision of a strong depending lug or hook member suitably disposed midway of the ends of a doubleended connecting link or swivel ring having its ends bifurcated; the hook or lug being adapted to be attached to a rung of a ladder, or other convenient place.

The invention further contemplates a strong bifurcated double-ended one piece connector for making connection to co-relative ends of a pair of said reinforced leather handles.

The invention further contemplates a strong one piece bifurcated end connector whereby a rigid but detachable connection may be made between co-relative ends of a pair of said reinforced leather handles and a bifurcated double ended connecting link or swivel ring.

The invention further contemplates the provision of a strong one piece bifurcated metal connector adaptable for making a strong rigid connection between one end of the said handle and a swivel connecting link, or ring, especially adapted for making connection between a pair of said handles, and for use with hose nozzles being, generally, part of a fire hose equipment.

The invention further contemplates a dual purpose swivel ring fitting which provides opposite bifurcated members in which to rigidly secure, in a simple manner, co-relative ends of a pair of U-shaped carrier handles. It also provides a ring fitting, of the character described, which is particularly adapted for use with hose nozzles being, generally, part of a fire hose equipment. It also provides, as stated, a double ended connector of rigid construction which will stand a great deal of hard usage, and which may be manufactured at, comparatively, a very small cost.

These and other objects of the invention will be better understood by referring to the illustrations shown in the accompanying drawing, and more fully described in the following specification, and more particularly pointed out in the appended claims.

Illustrated in the drawing:—

Figure 1 is a side view of the invention embodying my improvements shown as installed upon a hose nozzle of a kind most generally forming part of a fire-hose equipment; the nozzle being shown in light broken lines.

Figure 2 is a sectional view, as seen from the plane 2—2, of Figure 1; the nozzle being shown in full lines, and partly in section;

Figure 3 is a top plan view as seen from the plane 3—3, of Figure 1, showing the manner in which a one piece bifurcated connector, together with the carrier handle, may be disconnectably secured to the lower swivel ring, or connecting link; the nozzle not being shown.

Similar characters refer to similar parts throughout the several views.

This invention consists of an upper bifurcated double ended connector and connecting link, or swivel ring, 10, which provides a dual purpose, namely:—that of forming a strong and rigid connection to co-relative ends 11, of a pair of leather encased metal carrier handles 12, of the character before mentioned, and a swivel connection to a hose-nozzle 13, being most generally used as part of a fire-hose equipment, and that of providing a downwardly extending attachment means, or hook 14, by which it may be hooked over a rung of a ladder, or other convenient place, by a fireman, who may be operating the hose line, when he desires to use his hands temporarily for some other purpose.

The invention also consists of a lower bifurcated double ended connector and connecting link, or swivel ring, 15, which provides a strong connection between a pair of detachable strong bifurcated end connectors, or handle end-caps 16, being rigidly secured to co-relative ends 11', of handles 12. The ring 15, is also adapted to form a swivel connection to the hose-nozzle 13, in a manner similar to that of ring 10, or as shown in Figures 1 and 2.

It may be here stated that, for facilitating assembling of handles 12, to respective rings 10, and 15, the end-cap 16, should first be secured over end 11', of the handle, by means of, preferably, rivets 17, and, preferably, before the handle has been bent or formed. In like manner end 11, of the handle, should be inserted, endwise, into the bifurcated ends, or handle end-caps 10', and there fastened, as by means of rivets 17. The handles 12, having a metal reinforcement bar 12', extending throughout the full length of its leather casing, being assembled to their respective connectors, as stated, may be now bent or formed to the desired shape, or that of a U, as is shown, for instance, in Figure 1.

End-cap, or connector 16, is provided with a transverse opening 16', and swivel ring 15, is provided with two opposite pairs of suitable lugs, or bifurcations, indicated, respectively, by reference characters 18 and 19, and 20 and 21, which, being, respectively, spaced a suitable distance apart, are adapted to receive connector 16, there-between. Horizontally through lugs 18, and 20, a suitable opening 22, is formed, and in line therewith, in lugs 19, and 21, is formed a suitable screw-threaded or tapped opening 23. It being desired to install a double handle carrier comprising the parts assembled, as above described, together with lower swivel ring 15, to nozzle 13, it will only be necessary to remove both upper and lower swivel ring screw threaded retaining rings, or screw collars, respectively, 24, and 25, slip ring 15, in place on the nozzle and replace ring 25, as shown, then slip ring 10, in place at the upper end of the nozzle, inserting, at the same time, connectors 16, between respective lugs 18 and 19, and 20 and 21, and there fasten, as by means of a screw threaded connecting pin 26, in the manner indicated in Figures 1, and 3. This being done, ring 24, may now be replaced, and both it, and ring 25, should be securely tightened against their respective seats 24', and 25'.

Both bifurcated ends of ring 10, should be, preferably, inclined, slightly downward, as shown in Figure 1, whereby to obtain a more pleasing effect in the design of the handle and, at the same time, present a more effective means of resisting upward forces which may be applied to the handles while the same is being handled roughly while operating a hose line at a fire, or elsewhere.

It is to be understood that end-caps 10', and 16, are adapted to snugly fit over the ends of handle 12, and there securely fastened, as stated, by means of rivets.

Having thus described the invention it can be readily understood that the minor details of its construction may be altered in several ways without departing from the spirit and scope of the invention, and without losing any of its attendant advantages. Therefore, what is claimed is desired to be secured by Letters Patent.

I claim:

1. A device, or the character described, comprising a ring having a pair of oppositely disposed outstanding bifurcated lugs formed integral therewith, and having a hook formed integral with the ring substantially midway of said lugs, the bifurcations of said lugs being adapted to receive an end of a reinforced leather handle there-between, substantially as described.

2. A device, of the character described, comprising a ring having an outstanding downwardly extending hook formed integral therewith, and having a pair of outstanding bifurcated lugs formed integral with the ring diametrically of each other and equidistant from either side of said hook, and an end of a reinforced leather handle rigidly secured between the bifurcations of the said lugs, substantially as described.

ALFRED ANDERSON.